April 2, 1940.   H. A. PITZEN   2,196,122
HAND SHOCKING IMPLEMENT
Filed Sept. 15, 1938

Inventor
H. A. Pitzen
By
Attorney

Patented Apr. 2, 1940

2,196,122

UNITED STATES PATENT OFFICE 2,196,122

HAND SHOCKING IMPLEMENT

Henry A. Pitzen, Mantador, N. Dak.

Application September 15, 1938, Serial No. 230,127

3 Claims. (Cl. 294—50)

This invention relates to a hand operable shocking implement or tool and it aims generally to provide a simple, practical and durable construction which will enable the operator to grab bundles, and lift or handle them to shocking position, eliminating stooping to a considerable extent as is necessary according to usual procedure.

It is further aimed to provide such an article which will enable the engagement of the bundle and the handling with minimum danger of injury to the hands and fingers.

It is further aimed to provide a novel means which will aid in detaching the device from a shock.

The more specific objects and advantages will become apparent from a consideration of the description following taken in connection with accompanying drawing illustrating an operative embodiment.

Figure 1:
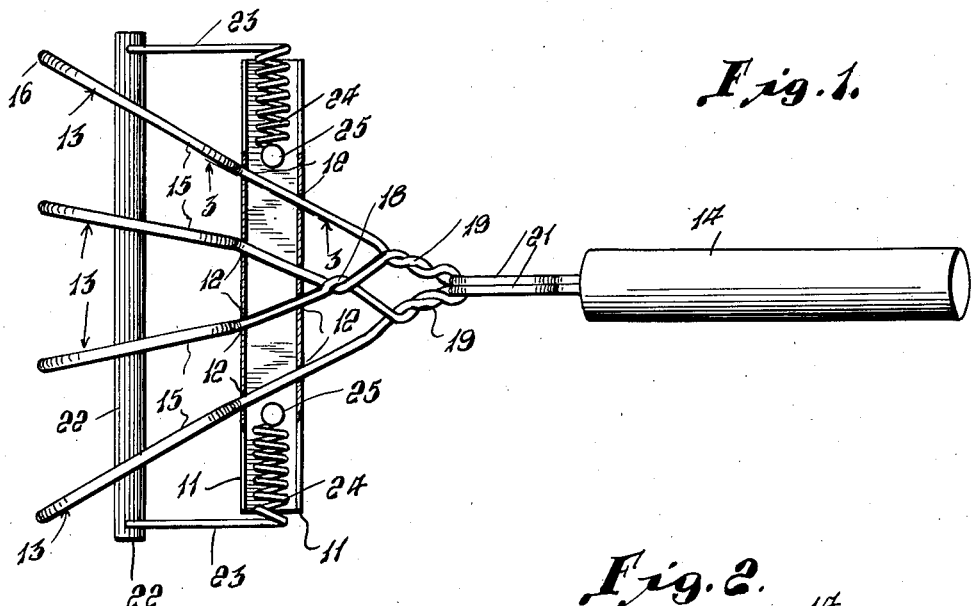
Figure 1 is a view of the tool or implement primarily in plan, but partly in section to illustrate details.

Referring specifically to the drawing wherein like reference characters designate like or similar parts, a U-shaped or channel backing member or support is provided at 10, the flanges 11 of which are uppermost. Said flanges have openings 12 therethrough through which tines 13 pass and in which they are welded or otherwise rigidly secured. Said tines may be employed in any desired number and arrangement but preferably radiate with respect to a handle 14. Said tines may be of any desired shape at their work ends but as shown are preferably arcuate at 15 in an upward direction and above backing member 10 and are also arcuate as at 16 in continuation thereof to the free ends 17 which are adapted to pierce the bundles for engagement therewith and subsequent handling or lifting to shocking position.

In the rear of the backing member 10, the various tines 13 are connected together in a rigid manner. The central tines, for instance, cross and are twisted together as at 18, and then extended outwardly and crossed and twisted with the outer tines as at 19. Such tines at 18 and 19 may be welded together if desired. The outermost tines are preferably extended to form shanks 20 and the inner pair of tines are preferably extended diagonally as at 21, and at the rear end the parts 20 and 21 are fastened in any suitable manner in the handle 14. Portion 21 serves as a very efficient brace. The handle 14 may be of wood or any other material and of any appropriate shape.

Disposed adjacent the free ends of the tines 17 and within the same is a stripping member or crossbar 22. Such stripping member 22 is resiliently mounted within the loops of the tines as by means of arms 23 extending from coil springs 24 which are fastened or anchored at 25 in any suitable manner in the channel member 10.

Figure 2:
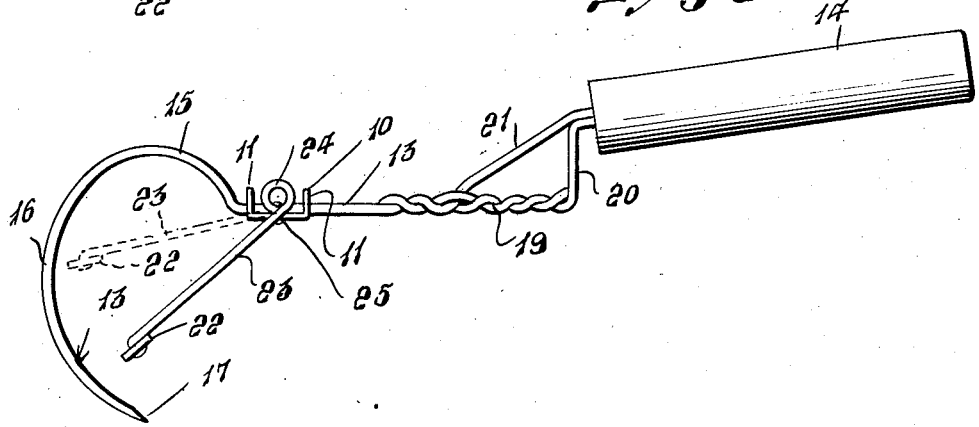
Figure 2 is a side elevation of the tool.
Figure 3:
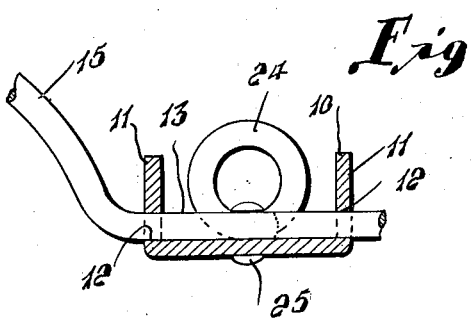
Figure 3 is a cross section taken on the line 3—3 of Figure 1.

As a result of the construction described, when the operator grasps the device in one hand at the handle 14, and moves it into engagement with a bundle, the tines 17 enter the latter and the stripping member 22 is automatically displaced or moved away from the tines 17 as suggested by dotted lines in Figure 2 serving as a spring-pressed pusher assisting in clearing the tines. Thus grasped, the bundle may be handled or lifted to shocking position. Disengagement of the tines will be greatly facilitated, by pressing the handle downwardly, since the bar 22 is in contact with the bundle and will in effect form a fulcrum for the remainder of the structure. The springs 24 aid the detaching action. This feature has great importance, since tines sometimes are difficult to remove or disengage from bundles.

Various changes may be resorted to provided they fall within the spirit and scope of the invention.

I claim as my invention:

1. A shocker implement of the class described having bundle-penetrating tines, said tines having rearwardly extending portions, a stripping member, a backing member transverse with respect to the tines, spring means mounted on the backing member having portions extending beyond the ends of the backing member and supporting said stripping member so as to move the stripping member inwardly with respect to the free ends of the tines through penetrating engagement of the tines with a bundle, such stripping member later functioning to assist in clearing the tines, said rearwardly extending portions of the tines being disposed across and fitted into the backing member to support the latter.

2. A shocker implement of the class described having bundle-penetrating tines, said tines having rearwardly extending portions, a stripping member, a backing member transverse with respect to the tines, spring means mounted on the backing member having portions extending beyond the ends of the backing member and supporting said stripping member so as to move the stripping member inwardly with respect to the free ends of the tines through penetrating engagement of the tines with a bundle, such stripping member later functioning to assist in clearing the tines, said rearwardly extending portions of the tines being disposed across and fitted into the backing member to support the latter, a handle rearwardly of the backing member extending from the tines, and said rearwardly extending portions being in substantially radiating relation from the handle.

3. A shocker implement of the class described having bundle-penetrating tines arcuate at the front and having rearwardly extending portions in substantially diverging relation, a stripping member, a backing member transverse with respect to the tines having a vertical flange, spring means mounted on the backing member having portions extending beyond the ends thereof and supporting said stripping member so as to move the stripping member inwardly with respect to the free ends of the tines through penetrating engagement of the tines with a bundle, such stripping member later functioning to assist in clearing the tines, said rearwardly extending portions of the tines being disposed across and fitted into the said flange to support the backing member, means securing the tines together rearwardly of the backing member, a handle extending from the latter means, and said tines adjacent the handle being interconnected to constitute attaching means and bracing means.

HENRY A. PITZEN.